US012612981B2

(12) United States Patent
Li et al.

(10) Patent No.: US 12,612,981 B2
(45) Date of Patent: Apr. 28, 2026

(54) CLAMP ASSEMBLY AND PIPE FIXING DEVICE ASSEMBLY

(71) Applicant: Illinois Tool Works Inc., Glenview, IL (US)

(72) Inventors: Zhilin Li, Shanghai (CN); Haijie Yu, Shanghai (CN)

(73) Assignee: Illinois Tool Works Inc., Glenview, IL (US)

( * ) Notice: Subject to any disclaimer, the term of this patent is extended or adjusted under 35 U.S.C. 154(b) by 92 days.

(21) Appl. No.: 18/617,917

(22) Filed: Mar. 27, 2024

(65) Prior Publication Data

US 2024/0318747 A1     Sep. 26, 2024

Related U.S. Application Data

(63) Continuation-in-part of application No. 18/126,213, filed on Mar. 24, 2023, now Pat. No. 12,221,992.

(30) Foreign Application Priority Data

Mar. 30, 2023    (CN) ......................... 202310331542.6

(51) Int. Cl.
*F16L 3/16*          (2006.01)
*B60R 16/08*          (2006.01)
(Continued)

(52) U.S. Cl.
CPC ................ *F16L 3/16* (2013.01); *B60R 16/08* (2013.01); *F16L 3/1033* (2013.01); *F16L 3/2235* (2013.01)

(58) Field of Classification Search
None
See application file for complete search history.

(56) References Cited

U.S. PATENT DOCUMENTS

| | | | |
|---|---|---|---|
| 2,236,929 A | | 4/1941 | Tinnerman |
| 2,657,442 A | * | 11/1953 | Bedford, Jr. .............. F16L 3/13 248/74.2 |

(Continued)

FOREIGN PATENT DOCUMENTS

| | | |
|---|---|---|
| EP | 4253773 A1 | 10/2023 |
| FR | 2382607 A1 | 9/1978 |

(Continued)

OTHER PUBLICATIONS

The extended European search report for Application No. 23164846.0, dated Aug. 4, 2023, European Patent Office, Germany (8 pages).

(Continued)

*Primary Examiner* — Steven M Marsh
(74) *Attorney, Agent, or Firm* — McAndrews, Held & Malloy, Ltd.

(57) ABSTRACT

The present disclosure provides a clamp assembly for connecting a first component to a second plate-shaped component, the clamp assembly comprising a clamp seat and a clamp. The clamp seat includes a clamp connecting portion and a pair of side walls extending from the clamp connecting portion, and a mounting space is formed between the pair of side walls. The clamp is held within the mounting space, and the clamp has a support and a pair of elastic arms. The pair of elastic arms obliquely extend toward each other from opposite sides of the support of the clamp clamps the second plate-shaped component therebetween. The clamp connecting portion rotatably connects the clamp assembly to the first component. The clamp assembly of the present disclosure is rotatable relative to the first component.

17 Claims, 7 Drawing Sheets

(51) Int. Cl.
     *F16L 3/10*          (2006.01)
     *F16L 3/223*         (2006.01)

(56)                References Cited

U.S. PATENT DOCUMENTS

| | | | |
|---|---|---|---|
| 4,163,485 A * | 8/1979 | Howell, Jr. ............. | B60M 1/34 |
| | | | 191/40 |
| 4,911,594 A | 3/1990 | Fisher | |
| 6,997,662 B2 | 2/2006 | Nishikawa | |
| 9,346,593 B2 | 5/2016 | Dang | |
| 10,637,226 B2 * | 4/2020 | Bell ....................... | H02G 7/053 |
| 12,221,992 B2 * | 2/2025 | Li ........................... | F16B 21/20 |
| 2011/0226913 A1 * | 9/2011 | Feige ........................ | F16L 3/13 |
| | | | 248/74.2 |
| 2024/0151327 A1 * | 5/2024 | Matsumoto ............. | F16L 3/223 |

FOREIGN PATENT DOCUMENTS

| | | | |
|---|---|---|---|
| JP | 2008051332 A | 3/2008 | |
| KR | 1531411 B1 * | 8/2014 | |

OTHER PUBLICATIONS

The office action for Application No. EP 23164846.0, dated Sep. 9, 2023, European Patent Office, Germany (2 pages).
The European search report for Application No. 25183047.7, dated Sep. 19, 2025, pp. 1-9, European Patent Office, Germany.

\* cited by examiner

CLAMP ASSEMBLY AND PIPE FIXING DEVICE ASSEMBLY

RELATED APPLICATIONS

The present application is a continuation-in-part application of U.S. application Ser. No. 18/126,213, filed on Mar. 24, 2023, entitled "Fastening Clip" and claims the benefit of Chinese Patent Application No. 2023103315426, filed Mar. 30, 2023, titled "Clamp Assembly and Pipe Fixing Device Assembly," the contents of each of which are hereby incorporated by reference.

TECHNICAL FIELD

The present disclosure relates to a fastener, and in particular to a fastener applied in the automotive field to connect two components.

BACKGROUND

Fasteners can be used for connecting multiple components together, for example, connecting interior trim parts, frames, panels and so on of a vehicle. When two components are connected by a fastener, a first component is connected to the fastener, and then the fastener with the first component connected thereto is mounted at a corresponding position on a second component, alternatively, the fastener is mounted at a corresponding position on the second component, and then the fastener is connected to the first component, such that the first component and the second component are connected to each other. For example, in an application, a vehicle wire clamp needs to be connected to a vehicle body metal plate by means of a fastener, such that an interior trim panel is securely connected to the vehicle body metal plate.

SUMMARY

The present disclosure provides a clamp assembly capable of being applied for connecting two components, substantially as illustrated by and described in connection with at least one of the figures, as set forth more completely in the claims.

BRIEF DESCRIPTION OF THE DRAWINGS

The foregoing and other objects, features, and advantages of the devices, systems, and methods described herein will be apparent from the following description of particular examples thereof, as illustrated in the accompanying figures; where like or similar reference numbers refer to like or similar structures. The figures are not necessarily to scale, emphasis instead being placed upon illustrating the principles of the devices, systems, and methods described herein.

DETAILED DESCRIPTION OF EMBODIMENTS

Figure 1A:
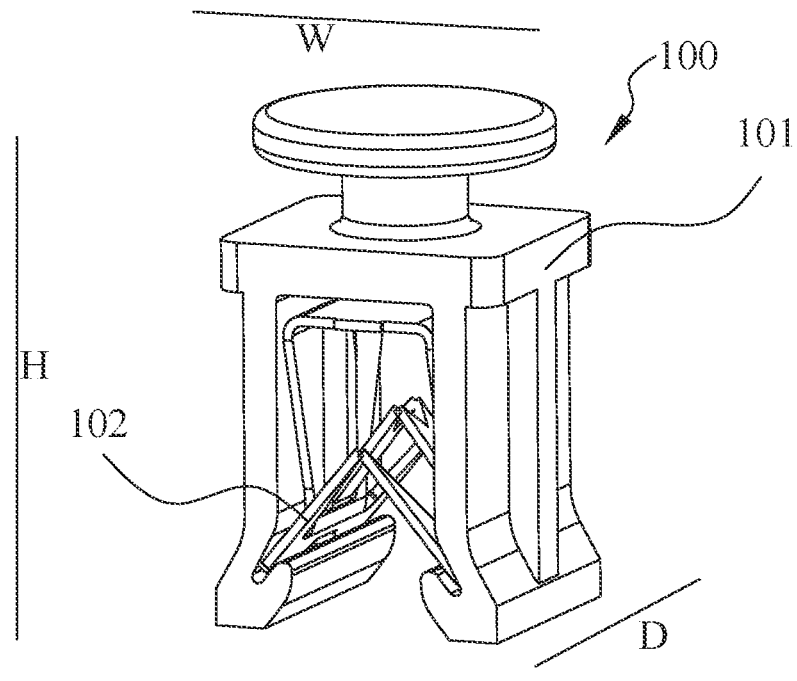
FIG. 1A is a perspective view of a clamp assembly according to the present disclosure.

Various specific embodiments of the present disclosure will be described below with reference to the accompanying drawings which constitute part of the present disclosure. It should be understood that although the terms indicating orientations, such as "front", "rear", "upper", "lower", "left", and "right", are used in the present disclosure to describe various illustrative structural parts and elements in the present disclosure, these terms used herein are merely for ease of description and are determined based on the illustrative orientations as shown in the accompanying drawings. Since the embodiments disclosed in the present disclosure can be arranged in different directions, these terms indicating orientations are only illustrative and should not be considered as limitations. If possible, the same or similar reference numerals used in the present disclosure refer to the same or similar components.

The clamp assembly is used for connecting a first component to a second plate-shaped component, the clamp assembly comprising a clamp seat and a clamp. The clamp seat comprises a clamp connecting portion and a pair of side walls extending from the clamp connecting portion. A mounting space is formed between the pair of side walls, and the clamp is held within the mounting space. The clamp has a support and a pair of elastic arms, the pair of elastic arms obliquely extending toward each other from opposite sides of the support of the clamp and being configured to clamp the second plate-shaped component therebetween. The clamp connecting portion is configured to rotatably connect the clamp assembly to the first component.

In the clamp assembly described above, the clamp connecting portion has a head, a neck and a body, the neck being connected with the head and the body and being between the head and the body. The neck has a smaller size than the head and the body. The neck is cylindrical, and the neck is capable of being received by a receiving slot of the first component, such that the clamp connecting portion is rotatably connected with the first component.

In the clamp assembly described above, the support of the clamp further comprises a base plate and a pair of supporting portions extending from opposite sides of the base plate and being arranged opposite each other. The pair of elastic arms are connected with distal ends of the pair of supporting portions, respectively, and the pair of elastic arms obliquely extend toward the base plate and toward each other.

In the clamp assembly described above, the pair of side walls each have a clamping portion at respective distal ends, and distal ends of the pair of elastic arms are capable of cooperating with the clamping portions so as to restrict movement of the clamp relative to the clamp seat in a direction away from the clamp connecting portion.

In the clamp assembly described above, the clamp seat has a front side and a back side at two ends of the pair of side walls, respectively, the mounting space extending through the front side and the back side, and the clamp being capable of being assembled into the mounting space from the front side or the back side.

In the clamp assembly described above, an outer contour of the head of the clamp connecting portion is circular, and an outer contour of the body is square.

In the clamp assembly described above, the clamp is made of metal sheet stamping, with the pair of elastic arms having a hardness greater than that of a mounting part.

The present disclosure further provides a pipe fixing device assembly comprising the clamp assembly described above and a first component, the first component being a pipe seat having a pipe connecting portion, the pipe connecting portion being capable of cooperating with the clamp connecting portion so as to connect the clamp assembly with the pipe seat, wherein the clamp connecting portion is configured to be rotatable relative to the pipe seat.

In the pipe fixing device assembly described above, the clamp connecting portion of the clamp assembly has a head, a neck and a body, the neck having a size smaller than sizes of the head and the body, and the neck being cylindrical.

The pipe connecting portion has a connecting plate having a receiving slot, the receiving slot having a size matching with that of the neck, such that the neck is capable of entering the receiving slot and the connecting plate is capable of being clamped between the head and the body.

In the pipe fixing device assembly described above, the pipe seat has a pipe mounting passage running through two sides of the pipe seat for fixing a pipe.

The clamp in the present disclosure may be connected to a plate-shaped mounting part of a vehicle body, such as a reinforcing rib. The clamp assembly of the present disclosure may connect a first component to a second plate-shaped component, and is rotatable relative to the first component.

Figure 1B:
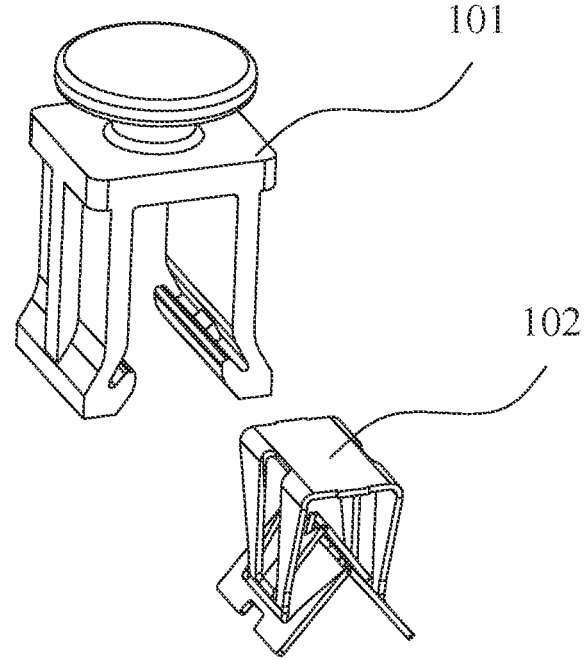
FIG. 1B is an exploded view of the clamp assembly in FIG. 1A.

FIG. 1A is a perspective view of a clamp assembly according to the present disclosure, and FIG. 1B is an exploded view of the clamp assembly in FIG. 1A.

As shown in FIG. 1A and FIG. 1B, the clamp assembly 100 comprises a clamp seat 101 and a clamp 102, the clamp assembly 100 having a height direction H, a width direction W and a thickness direction D. The clamp 102 may be assembled into the clamp seat 101 in the thickness direction D, and the clamp assembly 100 may connect a first component to a second component.

Figure 2A:
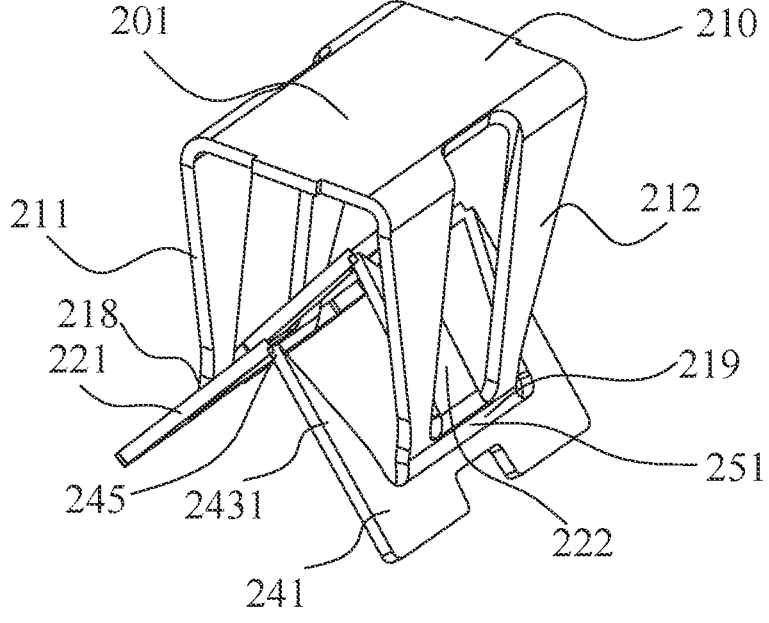
FIG. 2A is a perspective view of a clamp in FIG. 1A.
Figure 2B:
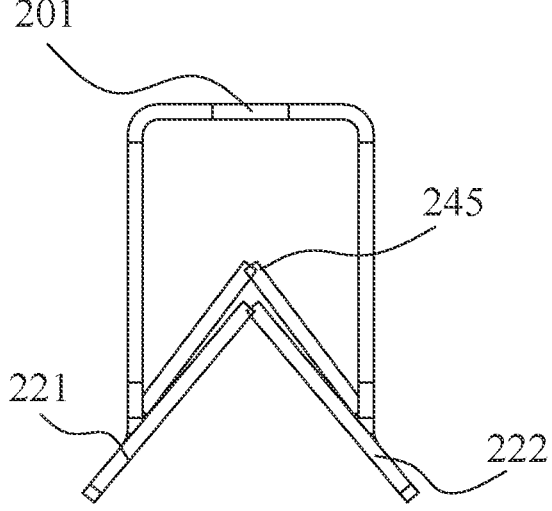
FIG. 2B is a front view of the clamp in FIG. 1A.
Figure 2C:
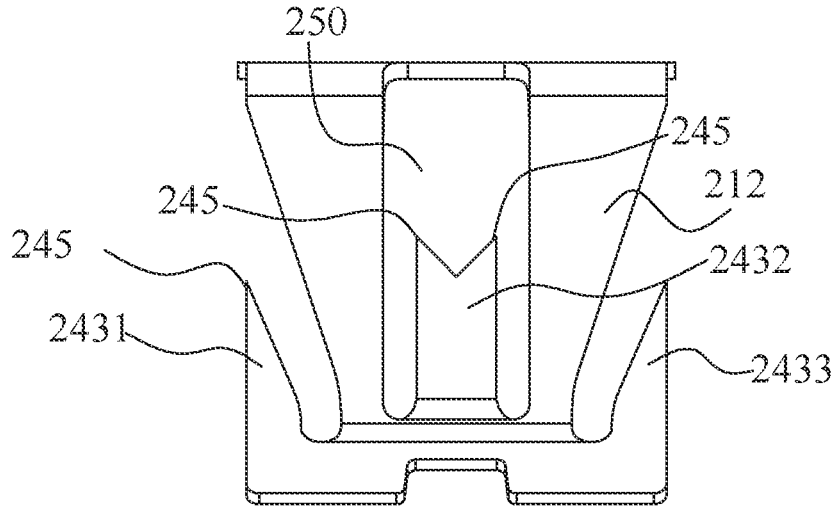
FIG. 2C is a side view of the clamp in FIG. 1A.

FIG. 2A is a perspective view of the clamp in FIG. 1A, FIG. 2B is a front view of the clamp in FIG. 1A, and FIG. 2C is a side view of the clamp in FIG. 1A. As shown in FIGS. 2A, 2B and 2C, the clamp 102 comprises a support 210 and a pair of elastic arms 221 and 222. The support 210 comprises a base plate 201 and a pair of supporting portions 211, 212. The supporting portions 211, 212 extend from opposite sides of the base plate 201 in the height direction H and the thickness direction D of the clamp assembly. The supporting portions 211, 212 are arranged opposite each other, and a spacing is formed between the supporting portions 211, 212. The pair of elastic arms 221 and 222 are connected with distal ends 218 and 219 of the supporting portions 211, 212, respectively, and the pair of elastic arms 221 and 222 obliquely extend toward the base plate 201 and toward each other. The pair of elastic arms 221 and 222 have a certain elasticity, and may be bent in a direction away from each other.

The pair of elastic arms 221 and 222 are symmetrical, and the pair of supporting portions 211, 212 are symmetrical. The structures of the supporting portions and the elastic arms are described below with using the supporting portion 212 and the elastic arm 222 as examples.

The supporting portion 212 extends from a side of the base plate 201 and gradually narrows, and an outer contour of the supporting portion is generally trapezoidal. A hollowed portion 250 is formed in the middle of the supporting portion 212.

The elastic arm 222 comprises an edge portion 241 and three claws 2431, 2432, 2433, and each of the three claws 2431, 2432, 2433 and the distal end 219 of the supporting portion 212 is connected to a first end 251 of the edge portion 241. The three claws 2431, 2432, 2433 obliquely extend toward the supporting portion on the other side. A distal end of each of the three claws 2431, 2432, 2433 has a sharp contact portion 245, the contact portion 245 being generally pointed shaped.

The clamp 102 is made of metal stamping with a material having relatively high hardness. The clamp 102 may clamp to a plate-shaped mounting part of the second component by means of the pair of elastic arms 221 and 222.

Figure 3A:
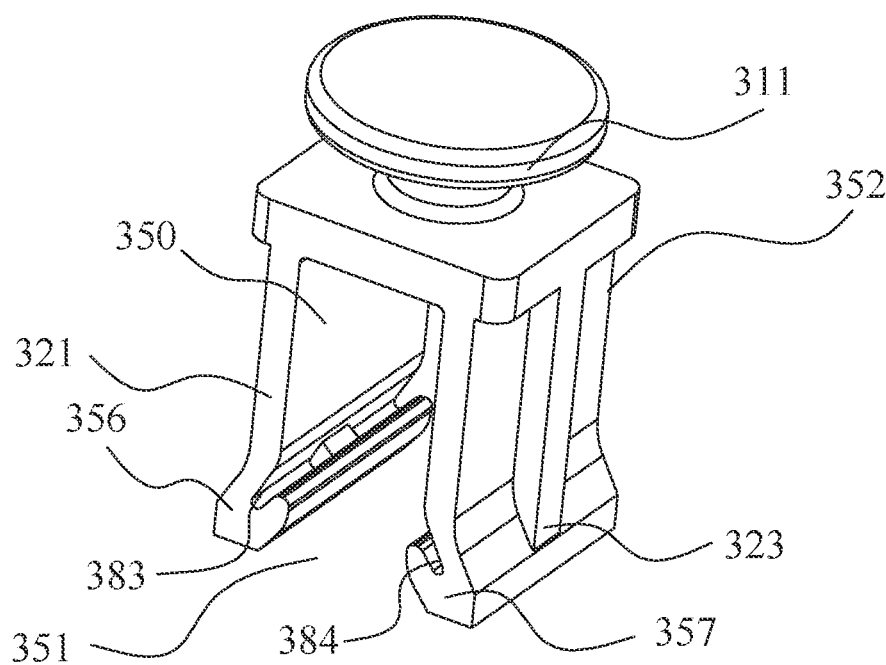
FIG. 3A is a perspective view of a clamp seat in FIG. 1A.
Figure 3B:
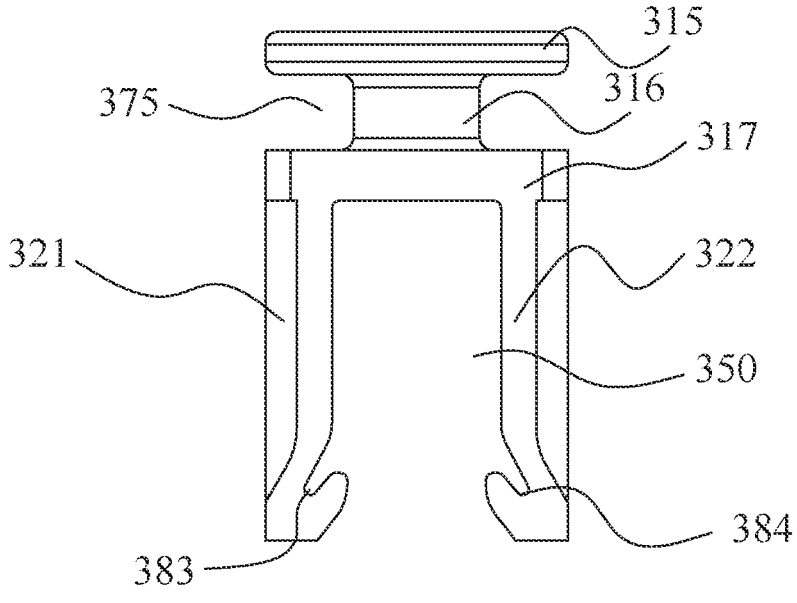
FIG. 3B is a front view of the clamp seat in FIG. 3A.

FIG. 3A is a perspective view of the clamp seat in FIG. 1A, and FIG. 3B is a front view of the clamp seat in FIG. 3A. As shown in FIG. 3A and FIG. 3B, the clamp seat 101 comprises a clamp connecting portion 311 and a pair of side walls 321, 322. The clamp connecting portion 311 comprises a head 315, a neck 316 and a body 317, both the head 315 and the neck 316 being cylindrical, and the neck 316 having a diameter smaller than that of the head 315. The body 317 is generally square, and the body 317 has a size greater than that of the neck 316, such that the head 315, the neck 316 and the body 317 enclose a recess 375. The pair of side walls 321, 322 extend from two sides of the body 317 in the height direction H and the thickness direction D of the clamp assembly 100. The pair of side walls 321, 322 and the body 317 jointly enclose a mounting space 350. The mounting space 350 is used for accommodating the clamp 102.

The clamp seat 102 has a front side 351 and a back side 352 at two ends of the pair of side walls 321 and 322, respectively. The mounting space 350 extends in the thickness direction of the clamp assembly and through the front side 351 and the back side 352. The clamp 102 may be assembled into the mounting space from the front side 351 or the back side 352 in the thickness direction of the clamp assembly.

Distal ends of the pair of side walls 321, 322 have oblique clamping portions 356 and 357, and grooves 383 and 384 are provided in the clamping portions 356 and 357 to accommodate edge portions of the elastic arms 221 and 222.

Figure 4:
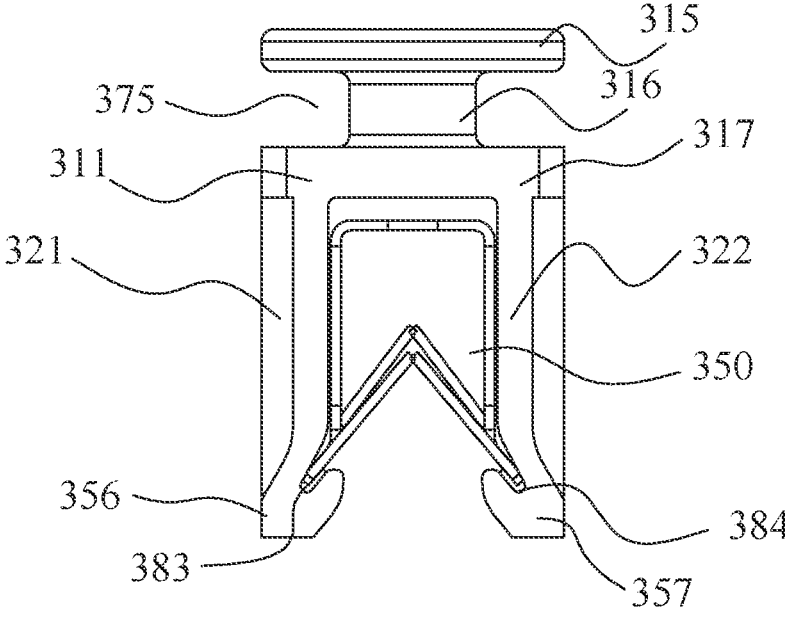
FIG. 4 is a front view of the clamp assembly in FIG. 1A.

FIG. 4 is a front view of the clamp assembly in FIG. 1A. As shown in FIG. 4, the clamp may be inserted into the clamp seat 101 in the thickness direction of the clamp assembly 100. The respective edge portions 241 of the elastic arms 221 and 222 enter the grooves 383 and 384, and the supporting portions 211, 212 get close to or come into contact with inner walls of the side walls 321, 322, so that the supporting portions 211, 212 are restricted by the side walls 321 and 322, and the clamp 102 may not move relative to the clamp seat 101 in the width direction W. The respective distal ends of the elastic arms 221 and 222 of the clamp 102 are restricted by bottoms of the grooves 383 and 384, and the base plate 201 of the clamp 102 is restricted by the body 317 of the clamp seat 101, so that the clamp 102 may not move in the height direction with respect to the clamp seat 101. The clamp 102 is stably located in the clamp seat 101, and is not easy to detach from the clamp seat 101.

Figure 5A:
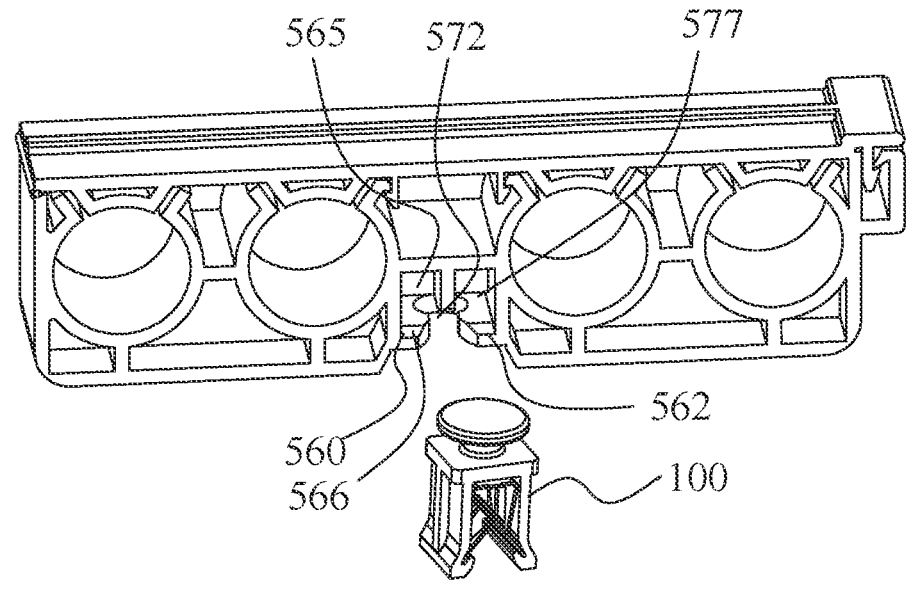
FIG. 5A is an exploded view of a pipe fixing device assembly according to the present disclosure.
Figure 5B:
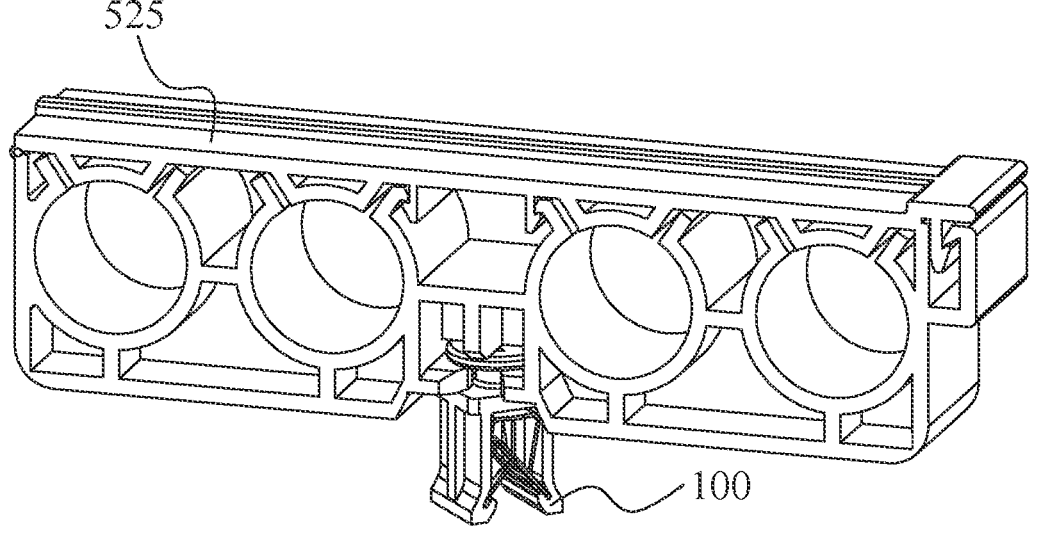
FIG. 5B is a perspective view of the pipe fixing device assembly in FIG. 5A with connected state.

FIG. 5A is an exploded view of a pipe fixing device assembly according to the present disclosure, and FIG. 5B is a perspective view of the pipe fixing device assembly in FIG. 5A with connected state.

As shown in FIG. 5A and FIG. 5B, the pipe fixing device assembly comprises the clamp assembly 100 and a pipe seat 525, and the clamp assembly 100 may be connected to the pipe seat 525.

The pipe seat 525 has a connecting portion 560, and the clamp assembly 100 may be assembled into the connecting portion 560. The connecting portion 560 comprises a lower plate 562 having a slot 572 and an accommodating cavity 565 located above the lower plate 562. When the clamp assembly 100 is connected to the pipe seat 525, the neck 316 of the clamp seat 101 may enter the slot 572, the head 315 is in the accommodating cavity 565 above the lower plate 562, the body 317 is below the lower plate 562, and the lower plate 562 enters the recess 375 of the clamp seat 101. When the clamp 102 is mounted in place in the clamp seat 101, the clamp assembly 100 may not move relative to the pipe seat 525 in the height direction H of the clamp assembly. The accommodating cavity 565 has a size slightly greater than that of the head 315, so that the clamp assembly 100 may rotate relative to the pipe seat 525.

The pipe seat 525 is further provided with a pipe mounting passage 545 running through two sides of the pipe seat 525, and a pipeline may pass through the pipe mounting passage 545 so as to be fixed in the pipe seat 525.

The neck 316 of the clamp seat 101 is designed to be cylindrical, so that the neck may rotate in the slot 572. The head 315 of the clamp seat 101 may be cylindrical or in other shapes, as long as the size of the accommodating cavity 565 satisfies the space required for the rotation of the head 315.

Figure 6A:
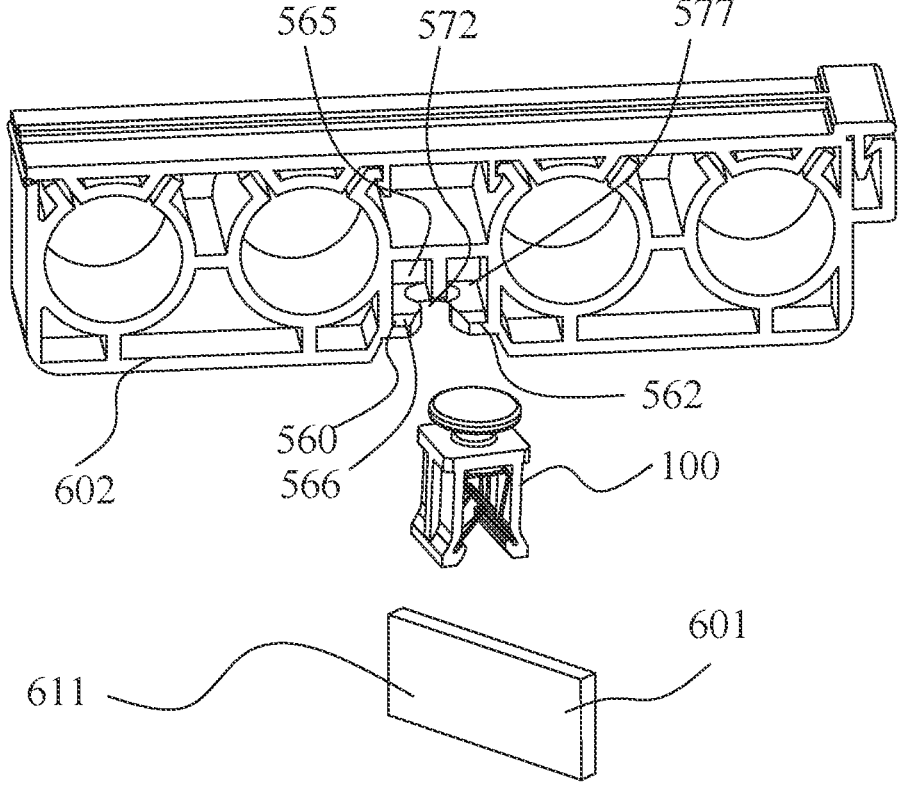
FIG. 6A is an exploded view of the pipe fixing device assembly in FIG. 5A and a second component according to the present disclosure.
Figure 6B:
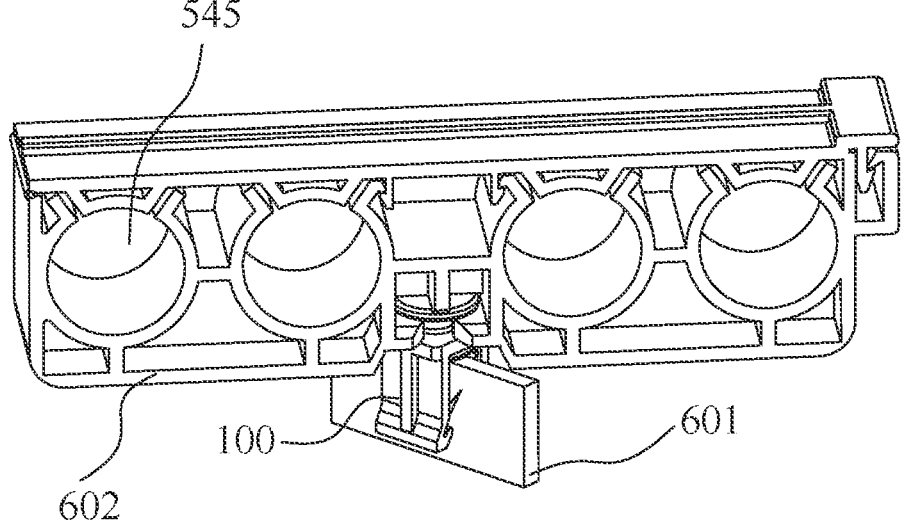
FIG. 6B is a perspective view of the pipe fixing device assembly in FIG. 5A and the second component with connected state.

FIG. 6A is an exploded view of the pipe fixing device assembly in FIG. 5A and a second component according to the present disclosure, and FIG. 6B is a perspective view of the pipe fixing device assembly in FIG. 5A and the second component with connected state.

In this embodiment, the pipe seat 525 may connect a first component 602 and a second plate-shaped component 601. The first component 602 is the pipe seat 525, the pipe seat 525 is used for fixing a pipeline in a vehicle, and the second component 601 is a reinforcing rib 611 on a metal plate of the vehicle body.

When the second component 601 is connected to the pipe seat 525, two connection operations can be used as required. In the first operation, the second component 601 is inserted into the clamp assembly 100, so that the second component 601 enters between the pair of elastic arms 221 and 222, and an elastic force generated by the outward deflection of the pair of elastic arms 221 and 222 clamps the clamp assembly 100 to the second component 601. Then the pipe seat 525 is sleeved to the neck 316 of the clamp assembly 100, so that the pipe seat 525 is connected to the second component 601. In the second operation, the clamp assembly is assembled into the connecting portion 560 of the pipe seat 525, and then the second component 601 is inserted into the clamp assembly 100 connected with the pipe seat 525.

When the clamp 102 is connected to the second component 601, the pair of elastic arms 221 and 222 are compressed, and contact portions of the pair of elastic arms 221 and 222 clamp on two sides of the second component 601. The second component 601 has a material hardness lower than that of the contact portions of the pair of elastic arms 221 and 222, so that the contact portions may be partially pierced into the second component 601, thus the clamp stably clamps the second component 601. The pair of elastic arms 221 and 222 are tilted toward the second component 601, so that when an upward pulling force is applied to the clamp, the contact portions of the respective claws of the elastic arms 221 and 222 further clamp the second component 601, thus the clamp may not be pulled out.

In the present disclosure, when the clamp assembly 100 is mounted to the second plate-shaped component 601, the pair of supporting portions 211 and 212 and the pair of elastic arms 221 and 222 of the clamp 102, and the pair of side walls 321 and 322 of the clamp seat are located at two sides of the second component 601, respectively, so that the clamp assembly 100 may not rotate relative to the second component 601. The pipe seat 525 (i.e., first component) is connected to the second component 601 by means of the clamp assembly 100, and the pipe seat 525 may rotate relative to the clamp assembly 100, so that the pipe seat 525 may be adjusted to a desired position.

In the present disclosure, the clamp assembly 100 may be mounted to the second plate-shaped component 601 with a smooth outer wall. There is no need to provide a ridge or a groove on the second component 601. In an application of the present disclosure, the second component 601 is a reinforcing rib of a vehicle body metal plate. When the vehicle body metal plate is cast, the reinforcing rib may be cast in one piece with the vehicle body metal plate, and there is no need to achieve connection by welding or other connecting processes. When the clamp assembly is connected to the reinforcing rib, since the reinforcing rib has a specific orientation, the clamp assembly may not rotate relative to the reinforcing rib. Therefore, in the present disclosure, the cylindrical neck of the clamp seat is provided such that the first component may rotate about the neck of the clamp seat, which allows the first component to be at the best angle.

While the present method and/or system has been described with reference to certain implementations, it will be understood by those skilled in the art that various changes may be made and equivalents may be substituted without departing from the scope of the present method and/or system. In addition, many modifications may be made to adapt a particular situation or material to the teachings of the present disclosure without departing from its scope. For example, block and/or components of disclosed examples may be combined, divided, re-arranged, and/or otherwise modified. Therefore, the present method and/or system are not limited to the particular implementations disclosed. Instead, the present method and/or system will include all implementations falling within the scope of the appended claims, both literally and under the doctrine of equivalents.

What is claimed is:

1. A clamp assembly for connecting a first component to a second plate-shaped component, the clamp assembly comprising:

a clamp seat comprising a clamp connecting portion and a pair of side walls extending from the clamp connecting portion, a mounting space being formed between the pair of side walls; and a clamp held within the mounting space, the clamp having a support and a pair of elastic arms, the pair of elastic arms obliquely extending toward each other from opposite sides of the support of the clamp and being configured to clamp the second plate-shaped component therebetween, wherein the clamp connecting portion is configured to rotatably connect the clamp assembly to the first component, wherein the support of the clamp further comprises:

a base plate; and a pair of supporting portions extending from opposite sides of the base plate and arranged opposite each other, wherein the pair of elastic arms are connected with distal ends of the pair of supporting portions, respectively, and the pair of elastic arms obliquely extend toward the base plate and toward each other.

2. The clamp assembly of claim 1, wherein the clamp connecting portion has a head, a neck, and a body, the neck being connected with the head and the body and being between the head and the body, the neck having a size smaller than sizes of the head and the body, the neck being cylindrical, and the neck being capable of being received by a receiving slot of the first component such that the clamp connecting portion is rotatably connected with the first component.

3. The clamp assembly of claim 1, wherein the pair of side walls each have a clamping portion at respective distal ends, and distal ends of the pair of elastic arms are capable of cooperating with the clamping portions so as to restrict movement of the clamp relative to the clamp seat in a direction away from the clamp connecting portion.

4. The clamp assembly of claim 2, wherein the clamp seat has a front side and a back side at two ends of the pair of side walls, respectively, the mounting space extending through the front side and the back side, and the clamp being capable of being assembled into the mounting space from the front side or the back side.

5. The clamp assembly of claim 4, wherein an outer contour of the head of the clamp connecting portion is circular, and an outer contour of the body is square.

6. The clamp assembly of claim 1, wherein the clamp is made of metal sheet stamping, with the pair of elastic arms having a hardness greater than that of a mounting part.

7. A pipe fixing device assembly, comprising:
the clamp assembly of claim 1; and
a first component, the first component being a pipe seat having a pipe connecting portion, the pipe connecting portion being capable of cooperating with the clamp connecting portion so as to connect the clamp assembly with the pipe seat, wherein the clamp connecting portion is configured to be rotatable relative to the pipe seat.

8. The pipe fixing device assembly of claim 7, wherein;
the clamp connecting portion of the clamp assembly has a head, a neck, and a body, the neck having a size smaller than sizes of the head and the body, and the neck being cylindrical; and
the pipe connecting portion has a connecting plate having a receiving slot, the receiving slot having a size matching with that of the neck such that the neck is capable of entering the receiving slot and the connecting plate is capable of being clamped between the head and the body.

9. The pipe fixing device assembly of claim 7, wherein the pipe seat has a pipe mounting passage running through two sides of the pipe seat for fixing a pipe.

10. A pipe fixing device assembly including a clamp assembly for connecting a first component to a second plate-shaped component, comprising:
the clamp assembly, including:
a clamp seat comprising a clamp connecting portion and a pair of side walls extending from the clamp connecting portion, a mounting space being formed between the pair of side walls; and
a clamp held within the mounting space, the clamp having a support and a pair of elastic arms, the pair of elastic arms obliquely extending toward each other from opposite sides of the support of the clamp and being configured to clamp the second plate-shaped component therebetween,
wherein the clamp connecting portion is configured to rotatably connect the clamp assembly to the first component; and
the first component, wherein the first component includes a pipe seat having a pipe connecting portion, the pipe connecting portion configured to cooperate with the clamp connecting portion so as to connect the clamp assembly with the pipe seat, wherein the clamp connecting portion is configured to be rotatable relative to the pipe seat.

11. The pipe fixing device assembly of claim 10, wherein the clamp connecting portion has a head, a neck, and a body, the neck being connected with the head and the body and being between the head and the body, the neck having a size smaller than sizes of the head and the body, the neck being cylindrical, and the neck being capable of being received by a receiving slot of the first component such that the clamp connecting portion is rotatably connected with the first component.

12. The pipe fixing device assembly of claim 1, wherein the pair of side walls each have a clamping portion at respective distal ends, and distal ends of the pair of elastic arms are capable of cooperating with the clamping portions so as to restrict movement of the clamp relative to the clamp seat in a direction away from the clamp connecting portion.

13. The pipe fixing device assembly of claim 11, wherein the clamp seat has a front side and a back side at two ends of the pair of side walls, respectively, the mounting space extending through the front side and the back side, and the clamp being capable of being assembled into the mounting space from the front side or the back side.

14. The pipe fixing device assembly of claim 13, wherein an outer contour of the head of the clamp connecting portion is circular, and an outer contour of the body is square.

15. The pipe fixing device assembly of claim 10, wherein the clamp is made of metal sheet stamping, with the pair of elastic arms having a hardness greater than that of a mounting part.

16. The pipe fixing device assembly of claim 10, wherein:
the clamp connecting portion of the clamp assembly has a head, a neck, and a body, the neck having a size smaller than sizes of the head and the body, and the neck being cylindrical; and
the pipe connecting portion has a connecting plate having a receiving slot, the receiving slot having a size matching with that of the neck such that the neck is capable of entering the receiving slot and the connecting plate is capable of being clamped between the head and the body.

17. The pipe fixing device assembly of claim 10, wherein the pipe seat has a pipe mounting passage running through two sides of the pipe seat for fixing a pipe.

* * * * *